United States Patent
Inoue et al.

[11] Patent Number: 5,357,023
[45] Date of Patent: Oct. 18, 1994

[54] ORGANOPOLYSILOXANES HAVING SILETHYLENE LINKAGES AND A CURABLE COMPOSITION COMPRISING THE SAME

[75] Inventors: Yoshio Inoue; Masatoshi Arai; Kazutoshi Fujioka; Tsuneo Kimura, all of Annaka, Japan

[73] Assignee: Shin-Etsu Chemical Co., Ohtemachi, Japan

[21] Appl. No.: 83,387

[22] Filed: Jun. 29, 1993

Related U.S. Application Data

[63] Continuation of Ser. No. 645,801, Jan. 25, 1991, abandoned, which is a continuation of Ser. No. 291,006, Dec. 28, 1988, abandoned, which is a continuation-in-part of Ser. No. 145,894, Jan. 20, 1988, abandoned.

[30] Foreign Application Priority Data

Jan. 26, 1987 [JP] Japan ................... 62-15413
Jan. 26, 1987 [JP] Japan ................... 62-15414

[51] Int. Cl.$^5$ ............................................. C08G 77/20
[52] U.S. Cl. ................................. 528/32; 528/31; 522/99
[58] Field of Search ............ 528/32, 31; 525/478; 522/99

[56] References Cited

U.S. PATENT DOCUMENTS

| | | | |
|---|---|---|---|
| 4,504,629 | 3/1985 | Lien et al. | 525/288 |
| 4,575,546 | 3/1986 | Klemarczyk et al. | 526/245 |
| 4,631,321 | 12/1986 | Suzuki | 525/478 |
| 4,683,278 | 7/1987 | Suzuki | 528/32 |

Primary Examiner—Ralph H. Dean
Attorney, Agent, or Firm—Henry T. Burke

[57] ABSTRACT

A novel organopolysiloxane compound having, in a molecule, at least one silyl-substituted ethyl group of the general formula $$[CH_2=CR^1-CO-O+CH_2\!\!\!\frac{}{b}SiR_2-O]_aR_{3-a}Si-C_2H_4-,$$

in which $R^1$ is a hydrogen atom or a methyl group, R is a monovalent hydrocarbon group and the subscripts a is 2 or and b is 1, 2 or 3, or a linear organopolysiloxane having, at each molecular chain end, at least one of such a group, can be prepared by first reacting a vinyl-containing organopolysiloxane with a hydrogen chlorosilane compound to effect the hydrosilation reaction between the silicon-bonded vinyl groups and the silicon-bonded hydrogen atoms and then the silicon-bonded chlorine atoms are subjected to a dehydrochlorination reaction with a silanol compound of the general formula $$CH_2=CR^1-CO-O+CH_2\!\!\!\frac{}{b}SiR_2-OH.$$

A composition comprising the organopolysiloxane and a photopolymerization initiator is highly sensitive to light and readily cured into a rubbery elastomer by irradiation with ultraviolet light.

12 Claims, 3 Drawing Sheets

ORGANOPOLYSILOXANES HAVING SILETHYLENE LINKAGES AND A CURABLE COMPOSITION COMPRISING THE SAME

BACKGROUND OF THE INVENTION

This application is a continuation application of application Ser. No. 07/645,801, filed Jan. 25, 1991, now abandoned, which is a continuation, of application Ser. No. 07/291,006, filed Dec. 28, 1988, now abandoned, which is a continuation-in-part application from a copending U.S. patent application Ser. No. 07/145,894 filed Jan. 20, 1988.

The present invention relates to a novel organopolysiloxane compound having silethylene linkages in the molecule and a method for the preparation thereof as well as a photocurable organopolysiloxane composition containing the novel organopolysiloxane. The invention also relates to a rubbery elastomer body of silicone rubber which is a cured product of the photocurable organopolysiloxane composition.

Liquid silicone rubber compositions capable of giving a silicone rubber elastomer by curing at room temperature or with heating at a relatively low temperature are widely used as a potting material, coating material and sealing material for various kinds of electric and electronic parts and instruments by virtue of their excellent heat resistance, weatherability and electric properties thereof after curing.

Room temperature-curable silicone rubber compositions are roughly classified into two types according to the mechanism of the crosslinking reaction for curing including those crosslinkable by the condensation reaction and those crosslinkable by the addition reaction. These two types of silicone rubber compositions have their own respective advantages and disadvantages. For example, the condensation-crosslinkable compositions are disadvantageous due to the relatively low velocity of curing taking several hours to several days for complete curing so that they are not suitable for a continuous process of production. The addition-crosslinkable compositions utilizing the so-called hydrosilation reaction in the presence of a platinum catalyst can be cured by heating for a few minutes to a few hours but they sometimes lose the curability when the composition is contacted with perspiration, soldering fluxes, sulfur and sulfur compounds as well as materials containing sulfur or a sulfur compound, e.g., sulfur-vulcanized rubbers, condensation-crosslinkable silicone rubber compositions containing a heavy metal catalyst for the condensation reaction and the like leading to poisoning of the platinum catalyst in addition to the problem of possible distortion caused by curing with heating.

On the other hand, several types of photocurable silicone rubber compositions have been developed as a curable material freed from the above mentioned problems and disadvantages. For example, Japanese Patent. Publication 52-40334 and Japanese Patent Kokai 60-104158 teach a composition comprising a vinyl-containing organopolysiloxane and mercapto-containing organopolysiloxane and curable by the mechanism of a photo-induced radical-addition reaction. Silicone rubber compositions of this type are disadvantageous in respect of the very unpleasant odor and corrosiveness to metals in contact therewith due to the mercapto groups. Further, Japanese Patent Publication 53-36515 and Japanese Patent Kokai 60-215009 propose a photocurable composition comprising an organopolysiloxane having (meth) acryloxy groups at the molecular chain ends and a photosensitizer. The silicone rubber compositions of this type have problems that, when an organopolysiloxane having a linear molecular structure of a large molecular weight is used with an object to obtain a cured rubber having excellent rubbery properties, the relative content of the (meth) acryloxy groups pertaining to the photopolymerization is so small that the composition has only poor curability and that the curing reaction is susceptible to inhibition by oxygen to cause incomplete curing of the composition in the surface layer exposed to the atmospheric air. Therefore, practically useful compositions curable by this mechanism can be obtained only by formulating an organopolysiloxane having a resinous structure and containing a relatively large amount of the (meth)acryloxy groups so that the cured composition has only quite poor rubbery properties.

Lien et al. in U.S. Pat. No. 4,504,629 teach a method of introducing α-alkylacrylate functionality to an aliphatically unsaturated polymer including a vinyl-terminated polydimethylsiloxane by the hydrosilation reaction of the polymer with a grafting agent, for example, of the formula in which $R^1$ and $R^3$ are each a monovalent hydrocarbon group, $R^2$ is a divalent group and n is 0, 1, 2 or 3, or, in particular, $CH_2{=}CCH_3{-}CO{-}O{-}CH_2{-}CH_2{-}CH_2{-}Si(CH_3)_2{-}O{-}Si(CH_3)_2{-}H$ to give a UV-curable organopolysiloxane compound having an acrylic or methacrylic group at each molecular chain end. The cured product thereof, however, has a rubbery but soft and tacky consistency not suitable for certain applications.

SUMMARY OF THE INVENTION

Accordingly, the inventors have continued extensive Investigations to develop a photocurable silicone rubber composition without the above described problems and disadvantages in the conventional photocurable silicone rubber compositions and, as a result of the investigations, have arrived at a discovery of a novel organopolysiloxane compound which can be a principal ingredient of a photo-curable silicone rubber composition.

The novel compound of the invention is an organopolysiloxane compound having, in a molecule, at least one polymerizable organosilyl-substituted ethyl group represented by the general formula in which $R^1$ is a hydrogen atom or a methyl group, R is a monovalent hydrocarbon group and the subscripts a is 2 or 3 and b is 1, 2 or 3.

Typically, the novel compound of the invention is an organopolysiloxane compound having a linear molecular structure with two silethylene linkages and represented by the general formula $$[CH_2=CR^1-CO-O+CH_2)_bSiMe_2-O]_aMe_{3-a}Si-C_2H_4+SiR_2-O)_n \qquad (II)$$
$$-SiR_2-C_2H_4-SiMe_{3-a}+O-SiMe_2+CH_2)_bO-CO-CR^1=CH_2]_a.$$

in which Me ms a methyl group, the subscript n is zero or a positive integer not exceeding 1000 and the other symbols each have the same meaning as defined above.

The photocurable organopolysiloxane composition of the invention comprises:

(A) the organopolysiloxane compound defined above or, typically, represented by the above given general formula (II), in which the subscript a is preferably 2 or 3; and (B) a photopolymerization initiator in an amount effective to promote the photopolymerization of the component (A) under irradiation with ultraviolet light, for example, in the range from 0.01 to 10 parts by weight per 100 parts by weight of the component (A).

DETAILED DESCRIPTION OF THE PREFERRED EMBODIMENTS

The novel silethylene-containing organopolysiloxane compound of the present invention is characterized by the unique polymerizable group represented by the general formula (I) or, typically, is a compound represented by the general formula:

$$[CH_2=CR^1-CO-O+CH_2)_bSiMe_2-O]_aMe_{3-a}Si-C_2H_4+SiR_2-O)_n \qquad (II)$$
$$-SiR_2-C_2H_4-SiMe_{3-a}+O-SiMe_2+CH_2)_bO-CO-CR^1=CH_2]_a.$$

In the formula, the symbol $R^1$ is a hydrogen atom or a methyl group and R is a substituted or unsubstituted monovalent hydrocarbon group selected from the class consisting of alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with halogen atoms, cyano groups and the like such as chloromethyl, 3,3,3-trifluoropropyl and 2-cyanoethyl groups. Particularly preferable as the group denoted by R are methyl, phenyl and 3,3,3-trifluoropropyl groups. Alkenyl groups are less preferable as the group denoted by R when the organopolysiloxane has a linear molecular structure as is shown by the general formula (II). The subscript n in the formula is zero or a positive integer not exceeding 1000 and the subscript a is 2 or 3 and the subscript b is 1, 2 or 3. It should be noted that, although even an organopolysiloxane in which the subscript a has a value of 1 is photocurable, the sensitivity of such an organopolysiloxane with admixture of a photosensitizer to ultraviolet-induced polymerization is outstandingly low and the thus photocured rubbery composition has a very low tensile strength as compared with the organopolysiloxanes having a value of a of 2 or 3.

Examples of the silethylene-containing organopolysiloxane compound of the invention represented by the general formula (II) include those compounds expressed by the following structural formulas, in which the symbols Me and Ph denote a methyl group and a phenyl group, respectively, a part of these groups being replaceable with 3,3,3-trifluoropropyl groups:

$$[CH_2=CH-CO-O-CH_2-SiMe_2-O-]SiMe_2-C_2H_4-SiMe_2-$$
$$-O-SiMe_2-C_2H_4-SiMe_2+O-SiMe_2-CH_2-O-CO-CH=CH_2];$$

$$[CH_2=CH-CO-O-CH_2-SiMe_2-O-]_2MeSi-C_2H_4-SiMe_2-$$
$$-O-SiMe_2-C_2H_4-SiMe+O-SiMe_2-CH_2-O-CO-CH=CH_2]_2;$$

$$[CH_2=CH-CO-O-CH_2-SiMe_2-O]_2MeSi-C_2H_4+SiMe_2-O)_{149}$$
$$-SiMe_2-C_2H_4-SiMe[-O-SiMe_2-CH_2-O-CO-CH=CH_2]_2;$$

$$[CH_2=CMe-CO-O-CH_2-SiMe_2-O-]_2MeSi-$$
$$-C_2H_4+SiMe_2-O)_{68}+SiPh_2-O)_{30}-SiMe_2-C_2H_4-$$
$$-SiMe[-O-SiMe_2-CH_2-O-CO-CMe=CH_2]_2; \text{ and}$$

$$[CH_2=CH-CO-O+CH_2)_3SiMe_2-O)_3Si-C_2H_4+SiMe_2-O)_{70}$$
$$+SiMe(CH_2CH_2CF_3)-O)_{161}-SiMe_2-C_2H_4-$$
$$-Si[-O-SiMe_2+CH_2)_3O-CO-CH=CH_2]_3.$$

The organopolysiloxane compound having the silyl-substituted ethyl group of the general formula (I) can be synthesized most conveniently by the following process. Thus, in the first place, an organopolysiloxane having at least one vinyl group directly bonded to the silicon atom is reacted with a hydrogen chlorosilane of the general formula $HSiCl_aR_{3-a}$, in which R and a each have the same meaning as defined above, in the presence of a platinum catalyst to cause the so-called hydrosilation reaction giving an organopolysiloxane having a chlorosilyl-substituted ethyl group of the formula $Cl_aR_{3-a}Si-CH_2CH_2-$, which is then subjected to a dehydrochlorination reaction with a silanol compound of the general formula

$$CH_2=CR^1-CO-O+CH_2)_bSiR_2-OH$$

in the presence of an acid acceptor such as a tertiary amine, e.g., triethyl amine.

When the organopolysiloxane has a linear molecular structure as represented by the General formula (II), the starting vinyl-containing organopolysiloxane is an α,ω-divinyl diorganopolysiloxane represented by the general formula $$CH_2=CH+SiR_2-O)_nSiR_2-CH=CH_2, \qquad (III)$$

in which R and n each have the same meaning as defined above, and a mixture thereof with a hydrogen chlorosilane compound represented by the general formula $HSiMe_{3-a}Cl_a$ and a platinum catalyst is subjected to the so-called hydrosilation reaction to produce a silethylene-containing organopolysiloxane having chlorine atoms bonded to the terminal silicon atoms and represented by the general formula (IV)

which is then subjected to a dehydrochlorination reaction in the presence of an acid acceptor with an acryloxyalkyl or methacryloxyalkyl dimethyl silanol represented by the general formula (V)

in which Me, $R^1$ and b each have the same meaning as defined above.

In particular, the hydrosilation reaction is performed by using the hydrogen chlorosilane compound in an amount equimolar to the vinyl groups in the vinyl-terminated diorganopolysiloxane of the formula (III) and heating the reaction mixture at a temperature of 70° to 80° C. The platinum catalyst is preferably chloroplatinic acid or a complex compound thereof. The dehydrochlorination reaction is performed by using the (meth) acryloxyalkyl dimethyl silanol compound of the formula (V) in an amount equimolar to the chlorine atoms in the chlorine-terminated organopolysiloxane of the general formula (IV). The acid acceptor in this dehydrochlorination reaction is preferably a tertiary amine such as triethyl amine.

Various compounds can be named as the examples of the α,ω-divinyl diorganopolysiloxane, hydrogen chlorosilane compound and (meth) acryloxyalkyl dimethyl silanol used in the above mentioned hydrosilation and dehydrochlorination reactions as the starting reactants and different combinations of them result in different silethylene-containing organopolysiloxanes of the invention. Several of the examples of the α,ω-divinyl diorganopolysiloxane include those expressed by the following structural formulas, in which Me, Vi and Ph denote methyl, vinyl and phenyl groups, respectively:

though not particularly limitative thereto. Suitable hydrogen chlorosilane compound includes methyl dichlorosilane of the formula $HSiMeCl_2$ and trichlorosilane of the formula $HSiCl_3$. Further, suitable (meth) acryloxyalkyl dimethyl silanol compound is exemplified by acryloxymethyl dimethyl silanol of the formula $[CH_2=CH-CO-O-CH_2-]Me_2SiOH$, methacryloxymethyl dimethyl silanol of the formula $[CH_2=CMe-CO-O-CH_2-]Me_2SiOH$, 3-acryloxypropyl dimethyl silanol of the formula and 3-methacryloxypropyl dimethyl silanol of the formula The silethylene-containing organopolysiloxane obtained in the above described manner is a novel compound not known in the prior art nor described in any literatures. This compound is curable by heating in the presence of an organic peroxide or by irradiation with electron beams to give a cured silicone rubber. Further, the compound is curable when it is admixed with a photopolymerization initiator and exposed to ultraviolet light. In addition to the application as a principal ingredient in a curable organopolysiloxane composition to give silicone rubber products, the organopolysiloxane of the invention having a relatively small molecular weight is also useful as a reactive diluent in curable compositions of other types.

When the above described novel organopolysiloxane compound is used as a principal ingredient in an ultraviolet-curable composition, it is preferable that the composition contains a photopolymerization initiator in an amount sufficient to promote the ultraviolet-initiated photopolymerization of the organopolysiloxane at the (meth) acryloxy groups. Various kinds of known compounds having an activity as a photopolymerization initiator can be used in the inventive ultraviolet-curable organopolysiloxane composition including acetophenone, propiophenone, benzophenone, xanthone, fluorene, benzaldehyde, anthraquinone, triphenyl amine, carbazole, 3-methyl acetophenone, 4-methyl acetophenone, 3-pentyl acetophenone, 4-methoxy acetophenone, 3-bromo acetophenone, 4-allyl acetophenone, 1,4-diacetyl acetophenone, 3-methoxy benzophenone, 4-methyl benzophenone, 4-chloro benzophenone, 4,4'-dimethoxy benzophenone, 4-chloro-4'-benzyl benzophenone, 3-chloroxanthone, 3,9-dichloroxanthone, 3-chloro-8-nonyl xanthone, benzoin, benzoin methyl ether, benzoin butyl ether, bis(4-dimethylamino phenyl) ketone, benzyl methoxy ketal, 2-chlorothiohxanthone, diethyl acetophenone, 1-hydroxy cyclohexyl phenyl ketone, 2-methyl [4-(methylthio)phenyl]2-morpholino-1-propanone, 2,2-di-methoxy-2-phenyl acetophenone and the like. Though not particularly limitative, the photopolymerization initiator as the component (B) is contained in the inventive composition, usually, in an amount in the range from 0.01 to 10 parts by weight per 100 parts by weight of the organopolysiloxane as the component (A). When the amount thereof is too small, no promoting effect can be obtained on the ultraviolet-initiated photopolymerization of the organopolysiloxane. When the amount thereof is too large, on the other hand, certain adverse influences are caused on the physical properties of the composition after curing.

The ultraviolet-curable organopolysiloxane composition of the invention can be prepared by uniformly blending the above described components (A) and (B). It is of course optional that the composition is admixed with various kinds of additives known in the art provided that the additive has no inhibitive effect on the photopolymerization of the composition. For example, inorganic fillers, such as fumed silica fillers, may be added in a limited amount not to cause undue absorption of the ultraviolet light.

By virtue of the (meth) acryloxy groups having high susceptibility to ultraviolet-initiated polymerization in the organopolysiloxane, the inventive organopolysiloxane composition can be cured very rapidly by exposure to ultraviolet light to give a cured silicone rubber, for example, within to 20 seconds though dependent on the intensity of the ultraviolet light. The thus obtained silicone rubber is advantageously non-corrosive and odorless so that the inventive composition is useful as a material for potting, sealing and coating in various kinds of electric and electronic pares and instruments manufactured in an assembly line operation.

In the following, the novel organopolysiloxane of the invention as well as the ultraviolet-curable organopolysiloxane composition formulated therewith are described in detail by way of examples, in which the term of "parts" always refers to "parts by weight" and the values of viscosity are all those obtained by the measurement at 25° C.

PREPARATION 1

Into a flask of 500 ml capacity equipped with a thermometer and stirrer were introduced 15.8 g of $1,3$-divinyl-1,1,3,3-tetramethyl disiloxane and 0.05 g of an isopropyl alcohol solution of chloroplatinic acid in a concentration of 2% by weight as platinum and the mixture was heated at 50° to 60 ° C. under agitation. Thereafter, 23 g of methyl dichlorosilane were added dropwise to the mixture in the flask which was cooled in an ice water bath to prevent temperature elevation by the heat of the exothermic reaction and to keep the temperature at 50° to 60 ° C. After completion of the dropwise addition of methyl dichlorosilane, the temperature of the reaction mixture was increased to 80° C. and agitated at this temperature for additional 2 hours to complete the reaction.

Figure 1:
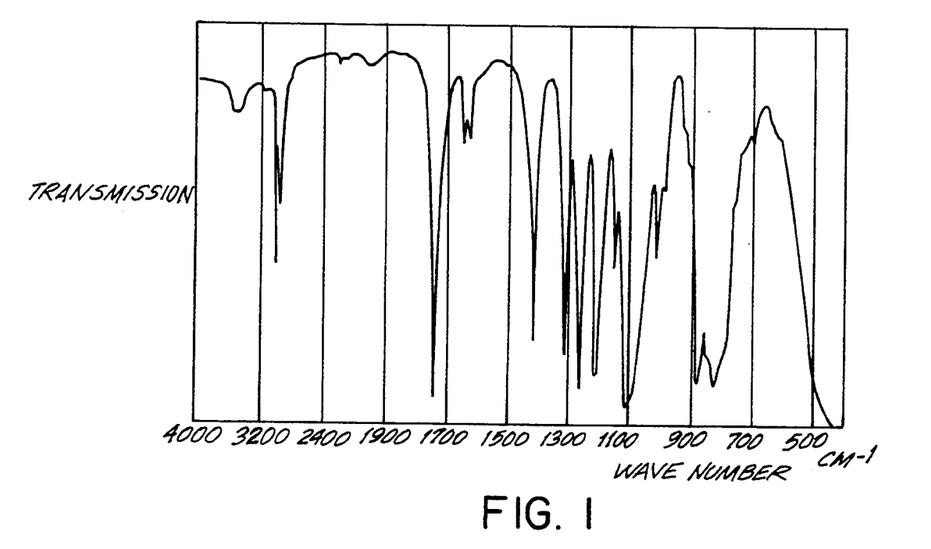
FIGS. 1 to 6 are each an infrared absorption spectrum of the silethylene-containing organopolysiloxane prepared in Preparations 1 to 6, respectively.

In the next place, a mixture of 60 g of triethyl amine and 64 g of acryloxymethyl dimethyl silanol dissolved in 100 g of toluene was added dropwise into the mixture in the flask to effect the dehydrochlorination reaction which was completed by agitating the mixture at 80° C. for additional 2 hours after the end of the dropwise addition of the silanol mixture. The reaction mixture was freed from the precipitates of triethyl amine hydrochloride by filtration and the filtrate was stripped of the solvent and volatile matter of low boiling point at 80° C. under a pressure of 4 mmHg to give 80 g of a light yellow liquid having a viscosity of 18 centistokes, refractive index of 1.4504 at 25° C. and specific gravity of 0.983 at 25° C. The results of the infrared absorption spectrophotometric analysis, of which the spectrum is shown in FIG. 1 of the accompanying drawing, led to a conclusion that this product was a compound expressed by the structural formula (CH₂=CH—CO—O—CH₂—SiMe₂—O—)₂MeSi-
—CH₂CH₂—SiMe₂—O—SiMe₂—CH₂C-
H₂—SiMe(—O—SiMe₂—CH-
2—O—CO—CH=CH₂)₂.

PREPARATION 2

Into a flask of 1 liter capacity equipped with a thermometer and stirrer were introduced 500 g of an α,ω-divinyl poly(dimethyliloxane) having a viscosity of 400 centistokes and containing 0.018 mole of vinyl groups per 100 g and it was dehydrated by heating at 120° C. for 2 hours under a stream of nitrogen gas with agitation. After cooling to room temperature, 0.1 g of the same chloroplatinic acid solution as used in Preparation 1 and 10 g of methyl dichlorosilane were added no the flask and the mixture was heated first at 50° C. for 1 hour and then at 80° C. for 3 hours to effect the hydrosilation reaction. Thereafter, nitrogen gas was bubbled into the mixture at the same temperature to remove the unreacted methyl dichlorosilane.

Figure 2:
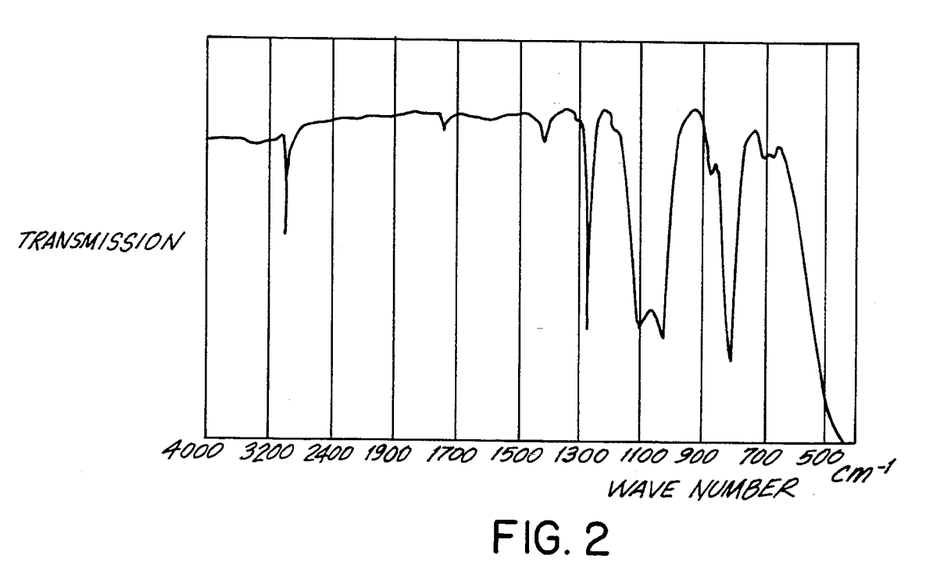

In the next place, 36.4 g of triethyl amine and 0.1 g of 3,5-di-tert-butyl-4-hydroxy toluene were added to the flask and then 36.1 g of acryloxymethyl dimethyl silanol were added dropwise to the mixture in the flask taking 30 minutes to effect the dehydrochlorination reaction which was completed by heating the mixture at 60° C. for additional 2 hours. The reaction mixture was freed from the precipitates of triethyl amine hydrochloride by filtration and the filtrate was stripped of the excess amount of triethyl amine by heating at 100° C. under a reduced pressure of 2 mmHg to give 485 g of a liquid having a viscosity of 588 centistokes, refractive index of 1.4080 at 25° C. and specific gravity of 0.978 at 25° C. The results of the infrared absorption spectrophotometric analysis, of which the spectrum is shown in FIG. 2 of the accompanying drawing, led to a conclusion that this product was a compound expressed by the structural formula (CH₂=CH—CO—O—CH₂—SiMe₂—O—)₂MeSi—CH₂CH₂—SiMe₂(-O—
—SiMe₂)₁₄₉—CH₂CH₂—SiMe(—O—SiMe₂—CH₂—O—CO—CH=CH₂)₂.

PREPARATION 3

Into a flask of 1 liter capacity equipped with a thermometer and stirrer were introduced 500 g of an a α,ω-divinyl poly(dimethylsiloxane) having a viscosity of 1000 centistokes and containing 0.012 mole of vinyl groups per 100 g and it was dehydrated by heating at 120° C. for 2 hours under a stream of nitrogen gas with agitation. After cooling to room temperature, 0.1 g of the same chloroplatinic acid solution as used in Preparation 3 and 10.8 g of trichlorosilane were added to the flask and the mixture was heated first at 50° C. for 1 hour and then at 80° C. for 3 hours to effect the hydrosilation reaction. Thereafter, nitrogen gas was bubbled into the mixture at the same temperature to remove the unreacted trichlorosilane.

Figure 3:
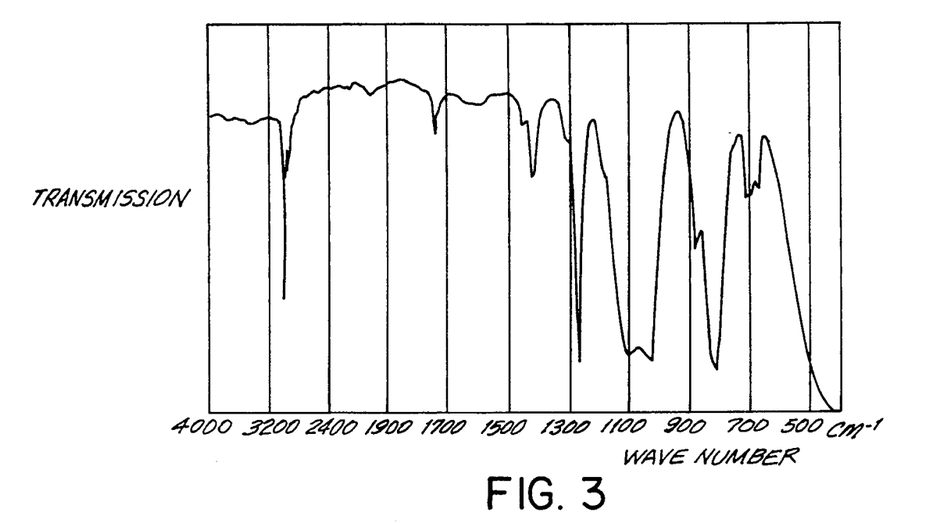

In the next place, 36.4 g of triethyl amine and 0.1 g of 3,5-di-tert-butyl-4-hydroxy toluene were added to the flask and then 28.9 g of acryloxymethyl dimethyl silanol were added dropwise to the mixture in the flask taking 30 minutes to effect the dehydrochlorination reaction which was completed by heating the mixture at 60° C. for additional 2 hours. The reaction mixture was freed from the precipitates of triethyl amine hydrochloride by filtration and the filtrate was stripped of the excess amount of triethyl amine by heating at 100° C. under a reduced pressure of $2$ mmHg to give 460 g of a liquid having a viscosity of 1230 centistokes, refractive index of 1.4069 at 25° C. and specific gravity of 0.978 at 25° C. The results of the infrared absorption spectrophotometric analysis, of which the spectrum is shown in FIG. 3 of the accompanying drawing, led to a conclusion that this product was a compound expressed by the structural formula (CH₂=CH—CO—O—CH₂—SiMe₂—O—)₃Si—CH₂CH₂—SiMe₂(-O—
—SiMe₂)₂₂₀—CH₂CH₂—Si(-O—SiMe₂—CH₂—O—CO—CH=CH₂)₃.

PREPARATION 4

Into a flask of 500 ml capacity equipped with a thermometer and stirrer were introduced 200 g of an α,ω- divinyl dimethyl diphenyl polysiloxane having a viscosity of 4000 centistokes and containing 0.018 mole of vinyl groups per 100 g, of which the content of the phenyl groups was 30% by moles of the overall hydrocarbon groups, and it was dehydrated by heating at 120° C. for 2 hours under a stream of nitrogen gas with agitation. After cooling to room temperature, 0.1 g of the same chloroplatinic acid solution as used in Preparation 1 and 4.6 g of methyl dichlorosilane were added to the flask and the mixture was heated first at 50° C. for 1 hour and then at 80° C. for 3 hours to effect the hydrosilation reaction. Thereafter, nitrogen gas was bubbled into the mixture at the same temperature to remove the unreacted methyl dichlorosilane.

Figure 4:
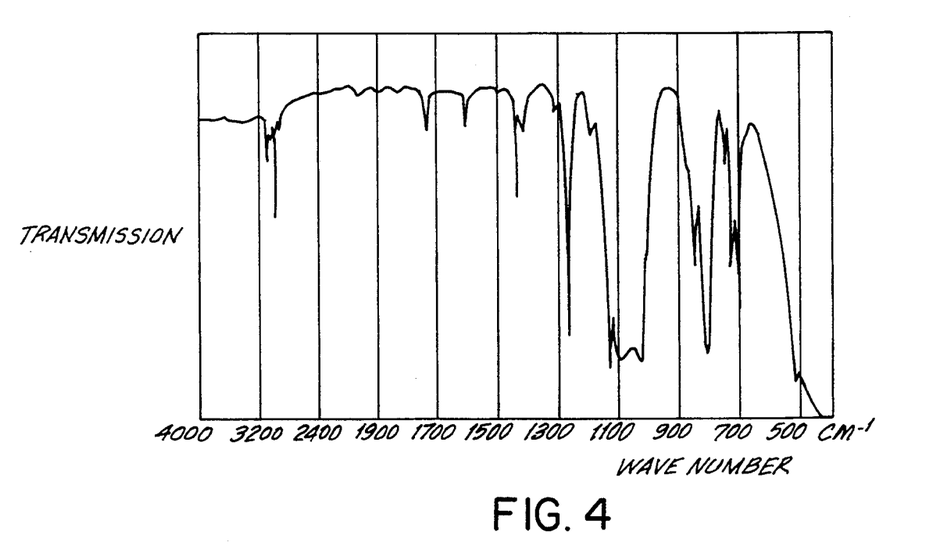

In the next place, 8.0 g of triethyl amine and 0.1 g of 3,5-di-tert-butyl-4-hydroxy toluene were added to the flask and then 11.5 g of acryloxymethyl dimethyl silanol were added dropwise to the mixture in the flask taking 30 minutes to effect the dehydrochlorination reaction which was completed by heating the mixture at 60° C. for additional 2 hours. The reaction mixture was freed from the precipitates of triethyl amine hydrochloride by filtration and the filtrate was stripped of the excess amount of triethyl amine by heating at 100° C. under a reduced pressure of 2 mmHg to give 196 g of a liquid having a viscosity of 4400 centistokes, refractive index of 1.508 at 25° C. and specific gravity of 1.081 at 25° C. The results of the infrared absorption spectrophotometric analysis, of which the spectrum is shown in FIG. 4 of the accompanying drawing, led to a conclusion that this product was a compound expressed by the structural formula (CH$_2$=CH—CO—O—CH$_2$—SiMe$_2$—O—)$_2$MeSi—

—CH$_2$CH$_2$—SiMe$_2$$\overline{(}$O—SiMe$_2)_{68}$$\overline{(}$O—SiPh$_2)_{30}$—

—O—SiMe$_2$—CH$_2$CH$_2$—SiMe(—O—SiMe$_2$—CH$_2$—O—CO—CH=CH$_2$)$_2$.

PREPARATION 5

Into a flask of 500 ml capacity equipped with a thermometer and stirrer were introduced 100 g of an α,ω-divinyl polysiloxane having a viscosity of 5000 centistokes and expressed by the average structural formula CH$_2$=CH$\overline{(}$SiMe$_2$—O$)_{170}$$\overline{(}$SiMe(CH$_2$CH$_2$CF$_3$)$_3$—O$)_{161}$SiMe$_2$—CH=CH$_2$ and it was dehydrated by heating at 120° C. for 2 hours under a stream of nitrogen gas with agitation. After cooling to room temperature, 0.1 q of the same chloroplatinic acid solution as used in Preparation 1 and 3.6 g of trichlorosilane were added to the flask and the mixture was heated first at 50° C. for 1 hour and then at 80° C. for 3 hours to effect the hydrosilation reaction. Thereafter, nitrogen gas was bubbled into the mixture at the same temperature to remove the unreacted trichlorosilane.

Figure 5:
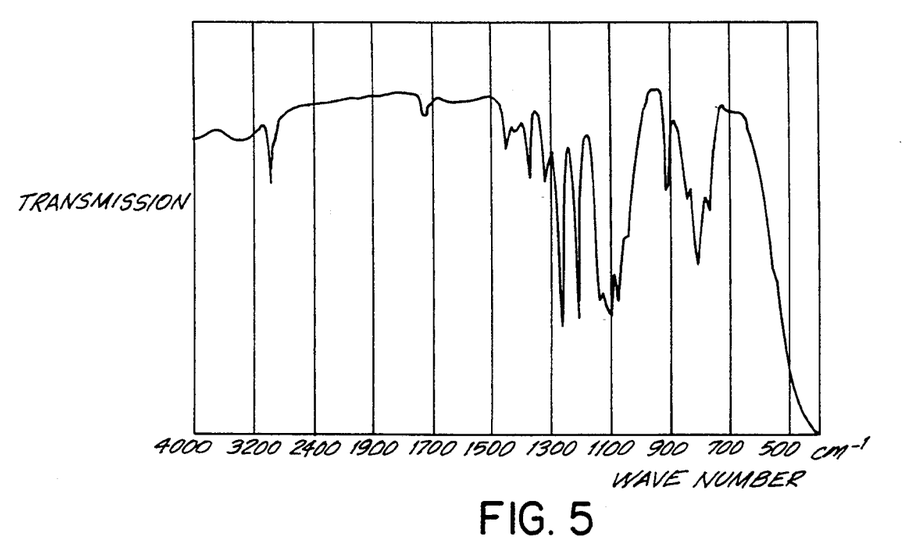

In the next place, 8.0 g of triethyl amine and 0.1 g of 3,5-di-tert-butyl-4-hydroxy toluene were added to the flask and then 8.0 g of acryloxymethyl dimethyl silanol were added dropwise to the mixture in the flask taking 30 minutes to effect the dehydrochlorination reaction which was completed by heating the mixture at 60° C. for additional 2 hours. The reaction mixture was freed from the precipitates of triethyl amine hydrochloride by filtration and the filtrate was stripped of the excess amount of triethyl amine by heating at 100° C. under a reduced pressure of 2 mmHg to give 195 g of a clear, light yellow liquid having a viscosity of 5300 centistokes, refractive index of 1.391 at 25° C. and specific gravity of 1.220 at 25° C. The results of the infrared absorption spectrophotometric analysis, of which the spectrum is shown in FIG. 5 of the accompanying drawing, led to a conclusion that this product was a compound expressed by the structural formula (CH$_2$=CH—CO—O—CH$_2$—SiMe$_2$—O—)$_3$Si—CH$_2$CH$_2$—

$\overline{(}$SiMe$_2$—O$)_{170}$$\overline{(}$SiMe(CH$_2$CH$_2$CF$_3$)—O$)_{161}$ —SiMe$_2$—CH$_2$CH$_2$—Si(—O—SiMe$_2$—CH$_2$—O—CO—CH=CH$_2$)$_3$.

PREPARATION 6

Figure 6:
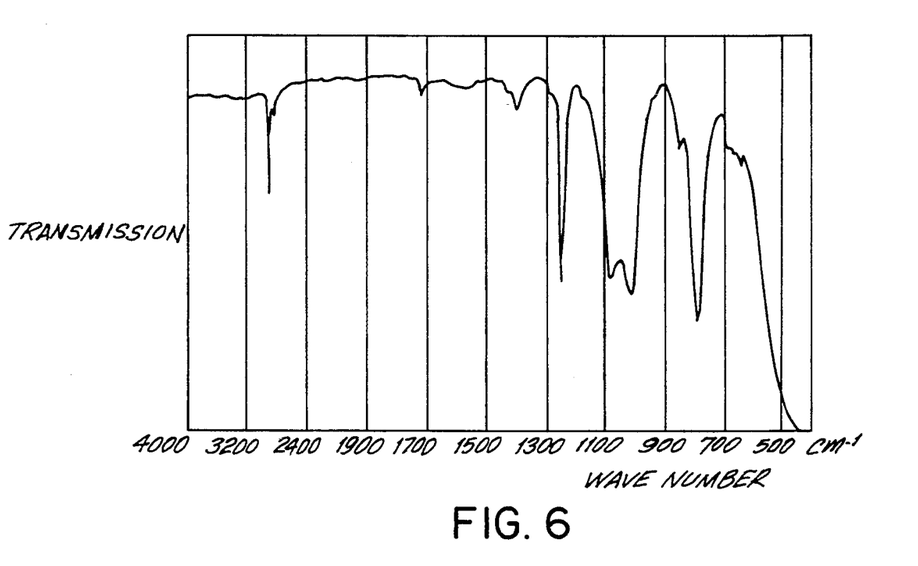

The experimental procedure was substantially the same as In Preparation 2 excepting replacement of 10 g of methyl dichlorosilane with 8.3 g of dimethyl chlorosilane, decrease of the amount of triethyl amine to 18.2 g and replacement of 36.1 g of acryloxymethyl dimethyl silanol with 23.0 g of 3-methacryloxypropyl dimethyl silanol. The result was that 488 g of a clear, light yellow liquid were obtained which had a viscosity of 480 centistokes, refractive index of 1.4063 at 25° C. and specific gravity of 0.974 at 25° C. The results of the infrared absorption spectrophotometric analysis, of which the spectrum is shown in FIG. 6 of the accompanying drawing, led to a conclusion that this product was a compound expressed by the structural formula

[CH$_2$=CMe—CO—O$\overline{(}$CH$_2)_3$SiMe$_2$—O—]Me$_2$Si—CH$_2$CH$_2$—SiMe$_2$—

$\overline{(}$O—SiMe$_2)_{149}$CH$_2$CH$_2$—SiMe$_2$[—O—SiMe$_2$$\overline{(}$CH$_2)_3$O—CO—CMe=CH$_2$].

PREPARATION 7

Into a flask of 1 liter capacity equipped with a thermometer and stirrer were Introduced 500 g of a 50% by weight toluene solution of a methyl phenyl siloxane block polymer having 0.036 mole of vinyl groups per 100 g, of which the content of the phenyl groups was 55% by moles of the overall hydrocarbon groups and the molar ratio of the difunctional siloxane units to trifunctional siloxane units was 1.0, and in was dehydrated by heating for 2 hours under reflux. After cooling to room temperature, 0.05 g of the same chloroplatinic acid solution as used in Preparation 1 and 15 g of methyl dichlorosilane were added to the flask and the mixture was heated first at 50° C. for 1 hour, then at 80° C. for 1 hour and finally under reflux for 3 hours to effect the hydrosilation reaction. Thereafter, the reaction mixture was distilled at 100° C. under a pressure of 2 mmHg to remove toluene and the unreacted methyl dichlorosilane.

In the next place, 40 g of triethyl amine and 0.1 g of 3,5-di-tert-butyl-4-hydroxy toluene were added to the flask together with 200 g of fresh toluene and then 31.8 g of acryloxymethyl dimethyl silanol were added dropwise to the mixture in the flask taking 30 minutes to effect the dehydrochlorination reaction which was completed by heating the mixture at 60° C. for additional 2 hours. The reaction mixture was freed from the precipitates of triethyl amine hydrochloride by filtration to give 446 g of a liquid having a viscosity of 55 centistokes, refractive Index of 1.4785 at 25° C. and specific gravity of 1.005 at 25° C. which was a solution containing 58.3% by weight of an organopolysiloxane as the non-volatile matter left after drying at $105°$ C. for 3 hours. The organopolysiloxane could be Identified to be a compound expressed by the unit formula $$[(CH_2=CH-CO-O-CH_2-SiMe_2-O-)_2MeSi-CH_2CH_2-SiMeO]_{0.5}[SiMe_2)]_{7.5}[SiMePhO]_{1.0}[SiPhO_{1.5}]_{9.0}.$$

EXAMPLE 1

Nine photocurable organopolysiloxane compositions, referred to as the compositions I to IX hereinbelow, were prepared each by uniformly blending 100 parts of one of the organopolysiloxane products prepared in Preparations 2, 3, 4 and 6, referred to as the polysiloxanes II, III, IV and VI, respectively, hereinbelow, with 0.3 to 5.0 parts of a photopolymerization initiator I, II or III shown below.

Photopolymerization initiator
I: benzophenone $C_6H_5-CO-C_6H_5$
II: diethoxy acetophenone $C_6H_5-CO-CH(OC_2H_5)_2$
III: dimethyl hydroxy acetophnone $C_6H_5-CO-C(CH_3)_2OH$ Table 1 below gives the kind of the polysiloxane and the kind and amount of the photopolymerization initiator in each of the compositions I to IX.

Each of the compositions I to IX was cast in a tray-like metal mold in a thickness of 2 mm and irradiated with ultraviolet light emitted from an ultraviolet lamp of 80 watts/cm output at an intensity of 0.5 joule/cm$^2$/second to give a dose of 0.5 to 5.0 joule/cm$^2$ as shown in Table 1 to be converted into a cured elastomer sheet.

Table 1 also gives the mechanical properties of the thus obtained rubber sheets.

TABLE 1

| Composition | Polysiloxane | Initiator (parts) | Dose of UV light, joule/cm$^2$ | Hardness, JIS | Tensile strength, kg/cm$^2$ | Ultimate elongation, % |
|---|---|---|---|---|---|---|
| I | II | I (1.0) | 0.5 | 26 | 5.3 | 100 |
| II | II | I (1.0) | 2.0 | 31 | 6.3 | 90 |
| III | II | I (1.0) | 4.0 | 31 | 7.0 | 110 |
| IV | III | II (5.0) | 0.5 | 12 | 3.5 | 220 |
| V | III | I (0.3) | 1.0 | 10 | 3.0 | 180 |
| VI | III | III (1.0) | 1.0 | 11 | 3.2 | 190 |
| VII | IV | I (1.0) | 0.5 | 36 | 2.5 | 40 |
| VIII | IV | II (2.0) | 0.5 | 38 | 3.2 | 60 |
| IX | VI | III (5.0) | 5.0 | — | 0.5 | 140 |

EXAMPLE 2

A photocurable composition in the form of a toluene solution was prepared by uniformly blending 100 parts of the organopolysiloxane solution prepared in Preparation 7 and 1.2 parts of 1-hydroxycyclohexyl phenyl ketone as a photopolymerization initiator. The solution was cast in the same metal mold as used in Example 1 in a depth of 2 mm and air-dried into a sheet which was irradiated with ultraviolet light in the same manner as in Example 1 to give a dose of 1.0 joule/cm$^2$ so that it was converted into a cured rubber sheet having a hardness, JIS, of 57, ultimate elongation of 60% and tensile strength of 37 kg/cm$^2$.

Further, a glass cloth-reinforced epoxy resin laminated plate for printed circuit board was coated with the same composition as above in a thickness of 0.1 mm as dried. After air drying, the laminated plate was irradiated with ultraviolet light in a dose of 1.0 joule/cm$^2$ to be converted into a cured coating film firmly adhering to the substrate surface. The thus formed coating film was very stable showing no changes in the film properties and adhesion to the substrate surface even after aging for 200 hours at 50° C. in an atmosphere of 98% relative humidity.

What is claimed is:

1. An organopolysiloxane having, in a molecule, at least one organosilyl-substituted ethyl group represented by the general formula:

$$[CH_2=CR^1-CO-O+CH_2)_b^-SiR_2-O]_aR_{3-a}Si-C_2H_4-,$$

in which $R^1$ is a hydrogen atom or a methyl group, R is a substituted or unsubstituted monovalent hydrocarbon group, the subscript a is 2 or 3 and the subscript b is 1, 2 or 3.

2. The organopolysiloxane as claimed in claim 1 which is represented by the general formula:

$$[CH_2=CR^1-CO-O+CH_2)_b SiMe_2-O-]_aMe_{3-a}Si-C_2H_4+SiR_2\text{---}O)_n SiR_2-C_2H_4-SiMe_{3-a}+O-SiMe_2+CH_2)_b O-CO-CR^1=CH_2]_a,$$

in which Me is a methyl group and the subscript n is zero or a positive integer not exceeding 100.

3. The organopolysiloxane as claimed in claim 1 wherein the subscript b is 1 or 3.

4. The organopolysiloxane as claimed in claims 1 or 2 wherein R is a halogen-substituted or unsubstituted alkyl group or aryl group.

5. The organopolysiloxane as claimed in claim 4 wherein the halogen-substituted or unsubstituted alkyl group or aryl group is selected from the group consisting of methyl, phenyl and 3,3,3-trifluoropropyl groups.

6. A method for the preparation of an organopolysiloxane having, in a molecule, at least one organosilyl-substitute ethyl group represented by the general formula:

in which $R^1$ is a hydrogen atom or a methyl group, R is a substituted or unsubstituted monovalent hydrocarbon group and the subscript a is 2 or 3 and the subscript b is 1, 2 or 3, which comprises the steps of:

(A) reacting an organopolysiloxane having, in a molecule, at least one vinyl group directly bonded to the silicon atom with a hydrogen chlorosilane represented by the general formula:

in which Me is a methyl group and the subscript a is 2 or 3, in the presence of a platinum catalyst to produce an organopolysiloxane having, in the molecule, at least one chlorosilyl-substituted ethyl group represented by the general formula:

in which Me and a each have the same meaning as defined above; and

(B) subjecting the organopolysiloxane having at least one chlorosilyl-substituted ethyl group to a dehydrochlorination reaction with a silanol compound represented by the general formula:

in which R, $R^1$ and b each have the same meaning as defined above, in the presence of an acid acceptor.

7. A photocurable organopolysiloxane composition which comprises, in admixture:

(A) an organopolysiloxane having, in a molecule, at least one organosilyl-substituted ethyl group represented by the general formula:

in which $R^1$ is a hydrogen atom or a methyl group, R is a substituted or unsubstituted monovalent hydrocarbon group, the subscripts a is 2 or 3 and the subscript b is 1, 2 or 3, and (B) a photopolymerization initiator in an amount effective to promote the photopolymerization of the component (A).

8. The photocurable organopolysiloxane composition as claimed in claim 7 wherein the component (A) is an organopolysiloxane represented by the general formula:

in which Me is a methyl group and the subscript n is zero or a positive integer not exceeding 1000.

9. The photocurable organopolysiloxane composition as claimed in claim 7 or 8 wherein the amount of the component (B) is in the range from 0.01 to 10 parts by weight per 100 parts by weight of the component (A).

10. An organopolysiloxane-based cured body which is a photopolymerization product of an organopolysiloxane composition according to claim 7 or 8 cured by irradiation with ultraviolet light.

11. The organopolysiloxane as claimed in claims 7 or 8 wherein R is a halogen-substituted or unsubstituted alkyl group or aryl group.

12. The organopolysiloxane as claimed in claim 11 wherein the halogen-substituted or unsubstituted alkyl group or aryl group is selected from the group consisting of methyl, phenyl and 3,3,3-trifluoropropyl groups.

* * * * *